United States Patent Office 3,115,010
Patented Dec. 24, 1963

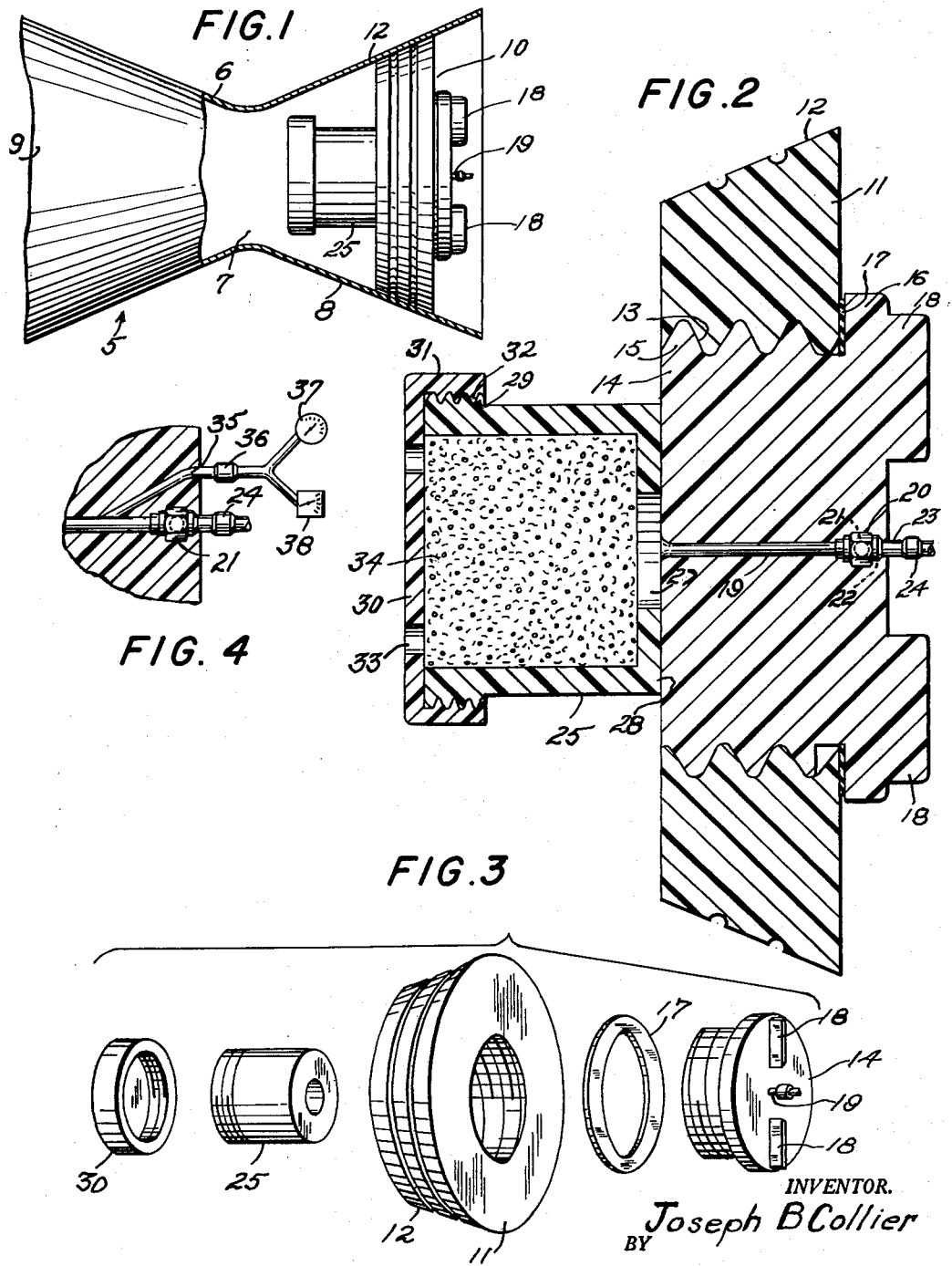

3,115,010
CLOSURE FOR CONTAINER
Joseph B. Collier, Huntsville, Ala., assignor to Thiokol Chemical Corporation, Bristol, Pa., a corporation of Delaware
Filed Dec. 12, 1960, Ser. No. 75,426
10 Claims. (Cl. 60—35.6)

The present invention relates to a method of and apparatus for maintaining a desired atmosphere in a container while at the same time permitting periodic inspection to determine conditions at the inside of the container. More particularly the invention is directed to a method of and apparatus for the maintenance and care of a solid propellant in rocket engines which are stored for long periods of time.

One of the problems inherent in the long term storage of solid propellant type rocket engines is the prevention of condensation on and absorption of moisture by the propellant material. It is the usual practice to place rocket engines in vapor proof storage containers, or rooms, during storage where the moisture content of the atmosphere in the storage area is maintained at a very low level by the use of desiccants or other suitable means. As an alternative practice, a shaped plug is inserted in the nozzle adjacent the outside of the throat with a sealant therebetween to prevent the entrance of moisture into the propellant chamber. To be sure that the propellant is in satisfactory condition, it is necessary to make frequent physical inspections. With both methods of storing rocket engines, the periodic inspections present a high nuisance factor in time and labor to remove the rocket engines from their storage containers or rooms, or remove and replace the sealed plugs.

One of the objects of the present invention is to provide a method of and apparatus for improving the reliability of the propellant charge in rocket engines after a period of storage.

Another object is to provide a method of and apparatus for the maintenance and care of rocket engines during storage which facilitates the removal of the closure for periodic inspections of the propellant charge and reduces the nuisance and cost of making such periodic inspections.

Still another object is to provide an improved closure for the propellant chamber of a rocket engine which is of relatively simple and compact construction and one which is reliable in operation for maintaining a desired condition in the propellant chamber.

These and other objects will become more apparent from the following description and drawings in which like reference characters denote like parts throughout the several views. It is to be expressly understood, however, that the drawing is for the purpose of illustration only and does not define the limits of the invention, reference being had for this purpose to the appended claims:

In the drawings:

FIGURE 1 is a sectional view through the nozzle of a rocket engine to illustrate the method of and apparatus for maintaining a desired atmosphere in the propellant chamber;

FIGURE 2 is an enlarged longitudinal sectional view through the closure for sealing the propellant chamber and showing the annular mounting member adapted to be sealed to the wall of the nozzle and the removable plug at the axis of the mounting member;

FIGURE 3 is an extended view showing the parts of the closure; and

FIGURE 4 is a sectional view of a plug of a modified construction having a pressure gauge and/or hygrometer connected to the propellant chamber to show the conditions therein at the exterior thereof.

The method of the present invention comprises, in general, the steps of flushing a chamber to be conditioned, through an opening therein, with a dry inert gas which absorbs moisture to displace the air and moisture in the chamber with the dry inert gas, closing and sealing the opening in the container and then supplying additional inert gas to the container to produce a pressure therein greater than atmospheric pressure. While the method of the present invention may have other applications, it is particularly adapted for conditioning the interior of the propellant chamber of rocket engines to prevent the deterioration of the propellant charge by condensation and absorption of moisture therein. The manufacture of so-called solid propellant rocket engines is completed by casting the propellant in the casing of the engine, either through the nozzle or through an opening to which nozzle is attached. The propellant, which may comprise a synthetic polymer, is in a fluid state when cast, but cures in a relatively short period into a self-supporting semi-rigid mass on the wall of the engine casing. The completed rocket engines are then stored for long periods of time before they are used as, for example, at the place where they are to be fired.

In accordance with the method as applied to a rocket engine, a stream of dry gas inert to the propellant is directed into the chamber through the throat of the rocket engine nozzle either immediately after the propellant has been cast or at any time thereafter. The dry gas displaces the air in the chamber and any moisture therein and in addition the dry gas absorbs moisture which flows into the dry gas as a vapor at a particular partial pressure. The flushing of the interior of the propellant chamber is continued until the chamber is substantially free of air and moisture. The propellant chamber is then closed by inserting a closure in the nozzle having a rim of the same contour as the wall of the nozzle. The joint between the nozzle and closure is sealed against the flow of gas or water vapor by applying a cement between the rim of the closure and the wall of the nozzle.

After the propellant chamber has been closed and sealed, dry inert gas is supplied to the interior of the chamber through a passage in the closure having a check valve which permits the gas to enter the chamber, but prevents flow outwardly therefrom. The pressure of the gas in the chamber then tends to cause any flow through a small leak to occur outwardly from the chamber and thereby prevent any air and moisture from entering the chamber. Thus, the inert gas in the propellant chamber under pressure further prevents leakage of air and moisture into the chamber in addition to the sealed closure.

Also in accordance with the method of the present invention a porous desiccant, such as silica-gel, is inserted into the closed chamber with the closure to absorb any residual moisture remaining in the chamber. The pressure and moisture conditions in the chamber also may be communicated to the exterior of the chamber as by a pressure gauge and/or a hygrometer to at all times visually indicate the conditions in the chamber. In addition, the closure may be in separable sealed parts to adapt one part to be removed for physical inspections of the propellant charge after which the chamber would be flushed, sealed and pressurized, in accordance with the method as described.

Referring now to the drawings, the present invention is shown applied to a rocket engine 5 having a continuous impervious casing wall 6 formed to provide a nozzle 7 at one end having a diverging section 8. The portion of the casing 6 forwardly of the nozzle 7 constitutes a chamber in which the solid propellant is cast and is hereinafter referred to as a combustion chamber or propellant chamber 9. The diverging section 8 of nozzle 7 is adapted to be closed and sealed by an improved closure 10.

In accordance with the invention, the closure 10 comprises an annular mounting ring 11 having a tapered peripheral rim 12 of the same conical contour of the wall of the diverging section 8 of nozzle 7. Thus, the rim 12 is adapted to closely fit the wall of the nozzle 7 and the joint therebetween is sealed by a suitable cement which also attaches the ring 11 to the wall of the nozzle. Preferably, the annular ring 11 is a molded polyurethane plastic and is sealed to the wall of the diverging nozzle section 8 by a liquid polysulphide polymer sealant which sticks to the mounting member and wall and provides a hermetically sealed joint therebetween. The mounting ring 11 has an axial opening therein having screw threads 13 into which a removable plug 14 is screwed.

The plug 14 is of generally cylindrical contour having screw threads 15 for cooperation with the screw threads 13 on the ring 11 and a radial flange 16 at one end adapted to overlie the rearward face of the ring adjacent the axial opening therein. A gasket 17 is provided between the radial flange 16 of plug 14 and rearward face of the ring 11 to seal the joint therebetween. In some instances the gasket may take the form of an O-seal with a lubricant therein to seal the joint. The rearward end of the plug 14 is provided with rearwardly projecting radial ribs 18 to facilitate screwing the plug into the ring 11.

Plug 14 also may be a molded plastic, such as polyurethane, and has a metal tube 19 molded therein to provide a passageway through the plug. A check valve 20 is provided between sections of the metal tube 19 and also is molded in the plastic plug 14. Check valve 20 has a ball 21 for engaging a seat 22 to permit flow through the tube into the propellant chamber 9 and prevent flow from the chamber. A nipple 23 projects from the end of the tube 19 at the rearward side of the plug 14 for connection to an external pipe through a coupling 24. Thus, the mounting ring 11 with the plug 14 screwed therein is adapted to be inserted into nozzle 7 of the rocket engine 5 as a unit, and the inert gas may be supplied to the interior of the propellant chamber 9 through the metal tube 19 and check valve 20. However, when a periodic inspection is necessary, the plug 14 may be removed from the ring 11.

When a desiccant, such as silica-gel is used, it is packed in a porous container 25 and attached to the inner face of the plug 14 as illustrated in FIGURE 2. In the illustrated embodiment, the container 25 comprises a hollow cup shaped member having an axial opening 27 surrounding the inner end of the metal tube 19 and a flat seat 28 overlying the inner face of the plug. The peripheral wall of the container 25 adjacent its open end has screw threads 29 for attaching a cover 30. The cover 30 has a rim 31 with screw threads 32 to adapt the cover 30 to be screwed onto the end of the cup shaped member 26 and a series of holes 33 to permit the flow of gas containing water vapor into the container and through the desiccant 34 which absorbs the water vapor. The container 25 may be mounted on the end of plug 14 by any suitable attaching means, and preferably is attached thereto by the same polysulphide polymer used between the rim 12 of the mounting member and wall of the nozzle 7. In this instance the polysulphide polymer acts as adhesive for attaching the container 25 to the plug 14. One form of the invention having now been described in detail, the mode of operation is next explained.

To obtain the full advantage of the invention, the mounting ring 11 is inserted in the nozzle 7 of the rocket engine 5 immediately after the propellant charge has been cast in the rocket engine casing and cured to a solid state. Propellant chamber 9 is then purged of air and moisture by flushing it with the dry inert gas, such as nitrogen. This flushing of the propellant chamber 9 removes most of the air and water vapor therefrom. The central plug 14 is then inserted and screwed tightly into place against the gasket 17 to seal the joint between the plug and ring. The polysulphide polymer sealant between the rim 12 of the ring 11 and nozzle 7 together with the gasket 17 between the ring and plug seals the propellant chamber from the ambient atmosphere. In a practical sense, however, it is most difficult to provide a moisture barrier which is absolutely impregnable. Changes in pressure in the propellant chamber 9 are induced by changes in absolute temperature. For this reason there is a tendency toward the exchange of gaseous molecules, due to the phenomon of breathing, as the temperature of the engine rises and falls during storage periods. As a result, water vapor would gradually be infused into the propellant chamber 9 which is further influenced by the difference in vapor pressure between the inside and outside of the chamber tending to cause water vapor to flow into the chamber. In order to reduce the infusion of moisture into the propellant chamber, additional dry inert gas, such as nitrogen, is injected into the chamber through the metal tube to produce pressure therein greater than the surrounding atmosphere. Thus, any flow through small leaks will be from the interior of the chamber to the outside ambient which further reduces any tendency of moisture to enter the chamber. Any residual moisture in the propellant chamber is absorbed by the desiccant in the container 25.

During subsequent months or years of storage when physical and visual inspection of the propellant charge is required in a planned schedule of maintenance and care, it is only necessary to remove the plug 14 after which the plug is replaced and the pressure of inert gas in the chamber raised above the ambient atmospheric pressure as explained above. While the plug is removed, the condition of the propellant can be examined physically for indication of deterioration.

The mounting ring 11 of closure 10 is designed to have a bursting strength between its inner threaded portion 15 and outer periphery 12 which is great enough to withstand the maximum difference in internal and external pressure acting on opposite sides of the closure, but less than the resistance of the cement at its periphery 12 and the force produced by the igniting material. For example, the ring would have a bursting strength to withstand the difference in pressure of the inert gas at the interior of the engine casing and a low atmospheric pressure which might be encountered if the rocket engine were transported by aircraft. Thus, the ring 11 bursts between its inner and outer peripheries and the plug is blown from the nozzle 7 automatically when the rocket engine is fired. After the plug 10 has been blown from the nozzle 7 the remaining fragments of the ring 11 still adhering to the nozzle are quickly and harmlessly burned therefrom.

A modified construction is illustrated in FIGURE 4 comprising a branch 35 from tube 19 molded and sealed in the plug 14 between the propellant chamber 9 and check valve 20 and the branch has a nipple 36 at the exterior of the plug for connection to a pressure gauge 37 or a hygrometer 38, or both, through a coupling 39. The pressure gauge 37 should be of a type having a hermetically sealed chamber communicating with the interior of the propellant chamber 9 so that it will not permit leakage into or out of the chamber. The hygrometer also should be of a type having a hermetically sealed compartment subjected to the atmosphere in propellant chamber 9. The modified construction otherwise is identical with that illustrated and described. Thus, the periodic inspections can be materially reduced as an indication of either the proper pressure or lack of moisture, or both, will indicate that further inspection is unnecessary.

It will now be observed that the present invention provides a method of and apparatus for improving the reliability of a propellant charge in a rocket engine after a long period of storage. It will further be observed that the present invention provides a method of and apparatus for reducing the cost in time and labor of making periodic inspections of the propellant charge in rocket engines. It will still further be observed that the present invention provides an improved construction of closure for closing the propellant chamber of a rocket engine which is of relatively simple and compact construction, and one which is reliable in operation for maintaining a desired atmosphere in the propellant chamber.

While two embodiments of the invention are herein illustrated and described it will be understood that further changes may be made in the construction and arrangement of elements without departing from the spirit or scope of the invention. Therefore, without limitation in this respect the invention is defined by the following claims.

I claim:

1. The method of storing rocket engines having a casing open at one end to prevent deterioration of a solid propellant by condensation and absorption of moisture comprising the steps of, flushing the interior of the chamber containing the propellant with a dry inert gas to absorb moisture from the propellant and displace air and moisture in the chamber, inserting a sealing closure plug in the opening and sealing the joint between the plug and engine casing, and then supplying additional dry inert gas to the interior of the chamber to produce a pressure in the chamber greater than atmospheric pressure during storage to cause any leakage to occur from the chamber outwardly to the atmosphere.

2. The method of storing rocket engines in accordance with claim 1 which comprises the step of transmitting the pressure at the interior of the propellant chamber through the closure plug to a pressure indicator at the exterior of the chamber to indicate at all times the pressure in the propellant chamber.

3. The method of storing rocket engines in accordance with claim 1 which comprises the step of connecting the interior of the propollant chamber to a hygrometer at the exterior of the chamber to indicate at all times the amount of moisture in the chamber.

4. A rocket engine of the type having a chamber with a solid propellant therein and a nozzle with a diverging section at one end of the chamber, the combination with said rocket engine of a closure in the diverging section of said nozzle for sealing the combustion chamber and propellant charge therein to maintain a pressure therein different from the ambient atmosphere comprising an annular mounting member having a rim of a contour to closely fit the wall of the nozzle, a sealing cement between the rim of the annular member and wall of the nozzle, a removable plug in the annular mounting member, means for detachably connecting and sealing the plug to the mounting member, and a passageway extending through the plug and having a check valve therein to automatically close and seal the passageway whereby to seal the combustion chamber of the rocket engine while permitting the removal of the plug for inspection of the combustion chamber and propellant charge therein.

5. A rocket engine in accordance with claim 4 in which the mounting member and plug are a molded plastic having cooperating screw threads, said plug having a peripheral flange overlying the mounting member, and a compressible gasket between the flange and plug to seal the joint therebetween.

6. A rocket engine in accordance with claim 5 in which the check valve is molded in the plug.

7. A rocket engine in accordance with claim 4 in which a perforate container is mounted on the inner end of said plug, and a granular desiccant in said container for absorbing moisture from the interior of the chamber.

8. A rocket engine in accordance with claim 4 in which a pressure gauge is connected to the passageway in the plug between the check valve and interior of the chamber.

9. A rocket engine in accordance with claim 4 in which a hygrometer having a closed chamber is connected to the passageway in the plug between the check valve and interior of the chamber.

10. In a container having a casing forming an opening at one side, a closure in said opening for sealing the container comprising an annular mounting member having a rim of a contour to closely fit the wall of the casing around the opening, a sealing cement between the rim of the annular member and casing wall, a removable plug in the annular mounting member, means for detachably connecting and sealing the plug to the mounting member, a passageway extending through the plug and having a valve seat therein, and a check valve in the passageway for engaging the valve seat whereby to seal the container while permitting fluid to be supplied to the chamber under pressure and the plug to be removed for inspection of the interior of the container.

References Cited in the file of this patent

UNITED STATES PATENTS

| | | |
|---|---|---|
| 2,469,350 | Lauritsen | May 10, 1949 |
| 2,793,492 | Sage et al. | May 28, 1957 |
| 2,900,771 | Levand | Aug. 25, 1959 |
| 2,917,894 | Fox | Dec. 22, 1959 |